US011251928B2

(12) United States Patent
Tang

(10) Patent No.: US 11,251,928 B2
(45) Date of Patent: Feb. 15, 2022

(54) WIRELESS COMMUNICATION METHOD, NETWORK DEVICE, AND TERMINAL DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 99 days.

(21) Appl. No.: 16/628,626

(22) PCT Filed: Aug. 11, 2017

(86) PCT No.: PCT/CN2017/097256
§ 371 (c)(1),
(2) Date: Jan. 3, 2020

(87) PCT Pub. No.: WO2019/028904
PCT Pub. Date: Feb. 14, 2019

(65) Prior Publication Data
US 2020/0162226 A1    May 21, 2020

(51) Int. Cl.
*H04W 4/00* (2018.01)
*H04L 5/00* (2006.01)
*H04W 72/12* (2009.01)

(52) U.S. Cl.
CPC ......... *H04L 5/0094* (2013.01); *H04L 5/0007* (2013.01); *H04L 5/0048* (2013.01); *H04W 72/1289* (2013.01)

(58) Field of Classification Search
None
See application file for complete search history.

(56) References Cited

U.S. PATENT DOCUMENTS

2010/0111107 A1* 5/2010 Han ............... H04L 5/0053
370/472
2015/0327226 A1* 11/2015 Cheng ............. H04W 74/08
370/329

(Continued)

FOREIGN PATENT DOCUMENTS

CN    101971681 A    2/2011
CN    106385709 A    2/2017

OTHER PUBLICATIONS

3GPP TSG RAN WG1 meeting #89 R1-1707726; Hangzhou, P.R. China May 15-19, 2017; On Symbol-Level Time-Domain Resource Allocation.

(Continued)

*Primary Examiner* — Phirin Sam
(74) *Attorney, Agent, or Firm* — Young Basile Hanlon & MacFarlane, P.C.

(57) ABSTRACT

Implementations of the present application provide a wireless communication method, a network device, and a terminal device. The network device implicitly indicates a resource scheduling mode and/or a reference signal transmission mode by means of a downlink control information format (DCI format). The method may include: sending downlink control information DCI to a terminal device by using a first DCI format among multiple DCI formats; and transmitting a data channel by using a resource scheduling mode corresponding to the first DCI format.

17 Claims, 5 Drawing Sheets

(56) References Cited

U.S. PATENT DOCUMENTS

| | | | |
|---|---|---|---|
| 2016/0302176 A1 | 10/2016 | Ahn et al. | |
| 2017/0079065 A1* | 3/2017 | Lyu | H04W 72/1289 |
| 2018/0084551 A1* | 3/2018 | Shin | H04W 72/042 |
| 2019/0182635 A1* | 6/2019 | Liu | H04L 1/0025 |

OTHER PUBLICATIONS

3GPP TSG RAN WG1 NR Ad-Hoc Meeting; R1-1709955; Qingdao, China, Jun. 27-30, 2017; UE-specific DCI contents in NR.
3GPP TSG RAN WG1 Meeting #90; Prague, Czech Rep, Aug. 21-25, 2017; R1-1712032.
3GPP TSG RAN WG1 NR Ad-Hoc#2; Qingdao, P.R. China; Jun. 27-30, 2017; R1-1710238.
3GPP TSG RAN WG1 meeting #89; Hangzhou, P.R. China; May 15-19, 2017; R1-1707726.
Extended EP Search Report for EP application 17920683.4 dated May 14, 2020.
Communication pursuant to Article 94(3) EPC for EP Application 17920683.4 mailed Apr. 20, 2021. (6 pages).
Indian Examination Report for IN Application 201917051803 dated Apr. 29, 2021. (7 pages).

* cited by examiner

WIRELESS COMMUNICATION METHOD, NETWORK DEVICE, AND TERMINAL DEVICE

CROSS-REFERENCE TO RELATED APPLICATION(S)

This application is a 371 application of International Application No. PCT/CN2017/097256, filed on Aug. 11, 2017, the entire disclosure of which is hereby incorporated by reference.

TECHNICAL FIELD

The present application relates to the field of communication, and more particularly to a wireless communication method, a network device, and a terminal device.

BACKGROUND

In a Long Term Evolution (LTE) system, resource scheduling is scheduling based on a slot, and the unit of each resource scheduling is a slot or subframe. In a New Radio (NR) system, scheduling of a resource may be based on the scheduling of a slot or the scheduling of a symbol. However, at present, a network device (e.g., base station) needs additional indication information to indicate which manner to be used for the resource scheduling, which will bring additional control signaling overhead, increase blind detection complexity for a terminal device to search for Downlink Control Information (DCI) and bring more power consumption.

SUMMARY

Implementations of the present application provide a wireless communication method, a network device, and a terminal device. The network device implicitly indicates a resource scheduling mode and/or a reference signal transmission mode through a downlink control information format (DCI format).

In a first aspect, an implementation of the present application provides a wireless communication method, including: sending downlink control information (DCI) to a terminal device through a first DCI format among multiple downlink control information formats (DCI formats), wherein the multiple DCI formats include a first type of DCI format and a second type of DCI format, the first type of DCI format corresponds to a first resource scheduling mode, the second type of DCI format corresponds to a second resource scheduling mode, the first resource scheduling mode indicates a time domain resource in unit of slot, the second resource scheduling mode indicates a time domain resource in unit of symbol, and the first DCI format is the first type of DCI format or the second type of DCI format; and transmitting a data channel through a resource scheduling mode corresponding to the first DCI format.

Optionally, the network device may classify downlink control information formats (DCI Formats) into a first type of DCI format and a second type of DCI format.

Therefore, in a wireless communication method of an implementation of the present application, a network device indicates a time domain resource in unit of slot through a first type of DCI format and indicates a time domain resource in unit of symbol through a second type of DCI format. Thereby, the network device may implicitly indicate a resource scheduling mode through a downlink control information format.

Optionally, in one implementation of the first aspect, the method further includes: transmitting a reference signal of the data channel through a reference signal mode corresponding to the first DCI format.

The first type of DCI format corresponds to a first reference signal mode, the second type of DCI format corresponds to a second reference signal mode, there is at least one reference signal located at a specific symbol of a slot in the first reference signal mode, there is at least one reference signal located at a specific symbol among one group of symbols in the second reference signal mode, and the one group of symbols are symbols used for transmitting the data channel and the reference signal of the data channel.

Therefore, in a wireless communication method of an implementation of the present application, a network device indicates the presence of at least one reference signal located at a specific symbol of a slot through a first type of DCI format and indicates the presence of at least one reference signal located at a specific symbol of a group of symbols through a second type of DCI format. Thereby, the network device may implicitly indicate a reference signal transmission mode through a downlink control information format.

Optionally, in one implementation of the first aspect, the specific symbol of the slot is a third time domain symbol or a fourth time domain symbol of the slot.

Optionally, in one implementation of the first aspect, the specific symbol among the one group of symbols is a first symbol among the one group of symbols.

Optionally, in one implementation of the first aspect, the reference signal is a demodulation reference signal (DMRS).

Optionally, in one implementation of the first aspect, sending the DCI to the terminal device through the first DCI format among the multiple DCI formats includes: sending the DCI to the terminal device on a first resource through the first DCI format.

When the first DCI format is the first type of DCI format, the first resource is a resource in unit of slot.

When the first DCI format is the second type of DCI format, the first resource is a resource in unit of symbol.

Optionally, in one implementation of the first aspect, the first resource is a control resource set or a search space for transmitting a physical downlink control channel.

In a second aspect, an implementation of the present application provides a wireless communication method, including: receiving downlink control information (DCI) from a network device; determining a downlink control information format (DCI format) of the DCI, wherein the DCI format of the DCI is a first type of DCI format or a second type of DCI format, the first type of DCI format corresponds to a first resource scheduling mode, the second type of DCI format corresponds to a second resource scheduling mode, the first resource scheduling mode indicates a time domain resource in unit of slot, and the second resource scheduling mode indicates a time domain resource in unit of symbol; and determining a resource scheduling mode of a data channel corresponding to the DCI according to the DCI format of the DCI.

Therefore, in a wireless communication method of an implementation of the present application, a network device indicates a time domain resource in unit of slot through a first type of DCI format and indicates a time domain resource in unit of symbol through a second type of DCI format. Thereby, the network device may implicitly indicate a resource scheduling mode through a downlink control information format.

Optionally, in one implementation of the second aspect, the method further includes: determining a reference signal mode of the data channel according to the DCI format of the DCI, wherein the first type of DCI format corresponds to a first reference signal mode, the second type of DCI format corresponds to a second reference signal mode, there is at least one reference signal located at a specific symbol of a slot in the first reference signal mode, there is at least one reference signal located at a specific symbol among one group of symbols in the second reference signal mode, and the one group of symbols are symbols used for transmitting the data channel and a reference signal of the data channel; and determining a reference signal position of the data channel according to a reference signal mode of the data channel.

Therefore, in a wireless communication method of an implementation of the present application, a network device indicates the presence of at least one reference signal located at a specific symbol of a slot through a first type of DCI format and indicates the presence of at least one reference signal located at a specific symbol of a group of symbols through a second type of DCI format. Thereby, the network device may implicitly indicate a reference signal transmission mode through a downlink control information format.

Optionally, in one implementation of the second aspect, the specific symbol of the slot is a third time domain symbol or a fourth time domain symbol of the slot.

Optionally, in one implementation of the second aspect, the specific symbol among the one group of symbols is a first symbol among the one group of symbols.

Optionally, in one implementation of the second aspect, the reference signal is a demodulation reference signal (DMRS).

Optionally, in one implementation of the second aspect, receiving the DCI from the network device includes: receiving the DCI from the network device on a first resource, wherein when the first resource is a resource in unit of slot, the DCI format is the first type of DCI format, and when the first resource is a resource in unit of symbol, the DCI format is the second type of DCI format.

Determining the DCI format of the DCI includes: determining the DCI format of the DCI according to the first resource.

Therefore, in a wireless communication method of an implementation of the present application, a terminal device may determine the DCI format corresponding to the DCI through the granularity of the first resource on the time domain, and further determine the resource scheduling mode and/or the reference signal transmission mode according to the type of the DCI format. Thereby, the operation complexity and energy consumption of the terminal device are reduced.

Optionally, in one implementation of the second aspect, the first resource is a control resource set or a search space for transmitting a physical downlink control channel.

In a third aspect, an implementation of the present application provides a network device that may execute a module or unit of the method in the first aspect or any alternative implementation of the first aspect.

In a fourth aspect, an implementation of the present application provides a terminal device that may execute a module or unit of the method in the second aspect or any alternative implementation of the second aspect.

In a fifth aspect, a network device is provided, and the network device includes a processor, a memory, and a communication interface. The processor is connected with the memory and the communication interface. The memory is used for storing instructions, the processor is used for executing the instructions, and the communication interface is used for communicating with other network elements under the control of the processor. When the processor executes the instructions stored in the memory, the execution causes the processor to execute the method in the first aspect or any possible implementation of the first aspect.

In a sixth aspect, a terminal device is provided, and the terminal device includes a processor, a memory, and a communication interface. The processor is connected with the memory and the communication interface. The memory is used for storing instructions, the processor is used for executing the instructions, and the communication interface is used for communicating with other network elements under the control of the processor. When the processor executes the instructions stored in the memory, the execution causes the processor to execute the method in the second aspect or any possible implementation of the second aspect.

In a seventh aspect, a computer storage medium is provided, and the computer storage medium stores program codes for instructing a computer to execute instructions of a method in the first aspect or any possible implementation of the first aspect.

In an eighth aspect, a computer storage medium is provided, and the computer storage medium stores program codes for instructing a computer to execute instructions of a method in the second aspect or any possible implementation of the second aspect.

In a ninth aspect, a computer program product including instructions is provided, wherein when being executed on a computer, the computer program product causes the computer to perform the methods described in the above-mentioned various aspects.

DETAILED DESCRIPTION

Technical solutions in implementations of the present application will be clearly and completely described below with reference to the drawings in the implementations of the present application.

The technical solutions of the implementations of the present application may be applied to various communication systems, such as a Global System of Mobile communication (GSM) system, a Code Division Multiple Access (CDMA) system, a Wideband Code Division Multiple Access (WCDMA) system, a General Packet wireless Service (GPRS) system, a Long Term Evolution (LTE) system, a LTE Frequency Division Duplex (FDD) system, a LTE Time Division Duplex (TDD) system, a Universal Mobile Telecommunication System (UMTS) system, a Worldwide Interoperability for Microwave Access (WiMAX) communication system, or a future 5G system.

Figures 1, 2, 3:
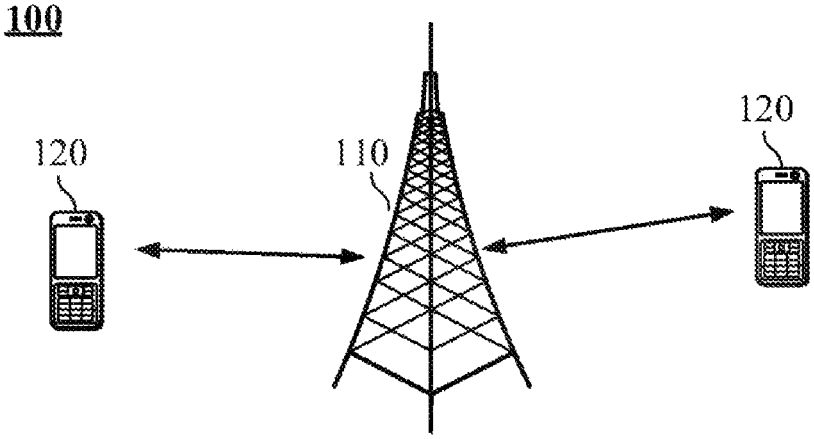
FIG. 1 shows a wireless communication system to which an implementation of the present application is applied.
FIG. 2 is a schematic flowchart of a wireless communication method according to an implementation of the present application.
FIG. 3 is a schematic flowchart of another wireless communication method according to an implementation of the present application.

FIG. 1 shows a wireless communication system 100 to which an implementation of the present application is applied. The wireless communication system 100 may include a network device 110. The network device 110 may be a device that communicates with a terminal device. The network device 110 may provide communication coverage for a specific geographical region, and may communicate with a terminal device (e.g., UE) in the coverage region. Optionally, the network device 110 may be a Base Transceiver Station (BTS) in a GSM system or CDMA system, a NodeB (NB) in a WCDMA system, an Evolutional Node B (eNB or eNodeB) in an LTE system, or a radio controller in a Cloud Radio Access Network (CRAN). Or, the network device may be a relay station, an access point, a vehicle-mounted device, a wearable device, a network side device in a future 5G network, or a network device in a future evolved Public Land Mobile Network (PLMN), etc.

The wireless communication system 100 further includes at least one terminal device 120 in the coverage region of the network device 110. The terminal device 120 may be mobile or fixed. Optionally, the terminal device 120 may be referred to as an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device or another processing device connected to a wireless modem, a vehicle-mounted device, a wearable device, a terminal device in a future 5G network or a terminal device in a future evolved Public Land Mobile Network (PLMN), or the like.

Optionally, Device to Device (D2D) communication may be performed between the terminal devices 120.

Optionally, the 5G system or network may also be referred to as a New Radio (NR) system or network.

FIG. 1 illustrates one network device and two terminal devices. Optionally, the wireless communication system 100 may include multiple network devices, and another quantity of terminal devices may be included within the coverage region of each network device, which is not limited in implementations of the present application.

Optionally, the wireless communication system 100 may further include other network entities such as a network controller, a mobile management entity, which is not limited in implementations of the present application.

In the 5G NR standard, two scheduling modes are supported: slot-based scheduling and symbol-based scheduling (non-slot-based scheduling). The non-slot-based scheduling is to reduce the granularity of scheduling in the time domain to an orthogonal frequency division multiplexing (OFDM) symbol, which may realize more flexible time domain resource allocation. Slot-based scheduling and non-slot-based scheduling have different time domain position determination manners for a demodulation reference signal (DMRS). The first column of DMRS in the slot-based scheduling mode is located at the 3rd or 4th symbol of a slot. The first column of DMRS in the non-slot-based scheduling mode is located at the first symbol of a data channel.

In addition, the base station will indicate which of the above two scheduling modes is used to schedule the terminal.

Optionally, in an implementation of the present application, the network device may implicitly indicate the resource scheduling mode and/or the reference signal transmission mode through a downlink control information format (DCI format).

For example, all DCI Formats are classified into a first type of DCI format and a second type of DCI format, the first type of DCI format corresponds to a first resource scheduling mode, the second type of DCI format corresponds to a second resource scheduling mode, the first resource scheduling mode indicates a time domain resource in unit of slot, and the second resource scheduling mode indicates a time domain resource in unit of symbol.

For example, in the R9 version of the protocol, the following DCIs are defined in total: DCI 0, DCI 1, DCI 1A, DCI 1B, DCI 1C, DCI 1D, DCI 2, DCI 2A, DCI 2B, DCI 3, and DCI 3A. DCI 0, DCI 3 and DCI 3A are DCI types related to a Physical Uplink Shared Channel (PUSCH) or a Physical Uplink Control Channel (PUCCH). And, DCI 1, DCI 1A, DCI 1B, DCI 1C, DCI 1D, DCI 2, DCI 2A, and DCI 2B are DCI types for a Physical Downlink Shared Channel (PDSCH). In this case, DCI 0, DCI 3, and DCI 3A may be classified as a first type of DCI format, and DCI 1, DCI 1A, DCI 1B, DCI 1C, DCI 1D, DCI 2, DCI 2A, and DCI 2B may be classified as a second type of DCI format.

It should be understood that the terms "system" and "network" are often used interchangeably in this document. The term "and/or" in this document is merely an association relationship describing associated objects, indicating that there may be three relationships, for example, A and/or B may indicate three cases: A alone, A and B, and B alone. In addition, the symbol "/" in this document generally indicates that objects before and after the symbol "/" have an "or" relationship.

FIG. 2 is a schematic flowchart of a wireless communication method 200 according to an implementation of the present application. As shown in FIG. 2, the method 200 may be performed by a network device, which may be a network device as shown in FIG. 1, and a terminal device in the method 200 may be a terminal device as shown in FIG. 1. The method 200 includes the following contents.

In act 210, a network device sends downlink control information (DCI) to a terminal device through a first DCI format among multiple DCI formats.

Optionally, the multiple DCI formats include a first type of DCI format and a second type of DCI format, the first type of DCI format corresponds to a first resource scheduling mode, the second type of DCI format corresponds to a second resource scheduling mode, the first resource scheduling mode indicates a time domain resource in unit of slot, and the second resource scheduling mode indicates a time domain resource in unit of symbol.

Optionally, the first DCI format is the first type of DCI format or the second type of DCI format.

In act 220, the network device transmits a data channel through a resource scheduling mode corresponding to the first DCI format.

Optionally, after receiving the DCI, the terminal device may determine the resource scheduling mode according to the format of the DCI, and accurately transmit the data channel through the time domain resource corresponding to the resource scheduling mode determined according to the format of the DCI.

Optionally, the method 200 further includes: transmitting, by the network device, a reference signal of the data channel through a reference signal mode corresponding to the first DCI format.

The first type of DCI format corresponds to a first reference signal mode, the second type of DCI format corresponds to a second reference signal mode, there is at least one reference signal located at a specific symbol of a slot in the first reference signal mode, there is at least one reference signal located at a specific symbol among one group of symbols in the second reference signal mode, and the one group of symbols are symbols used for transmitting the data channel and the reference signal of the data channel.

Optionally, the reference signal is a demodulation reference signal (DMRS).

Optionally, the specific symbol of the slot is a third time domain symbol or a fourth time domain symbol of the slot.

Optionally, the specific symbol among the one group of symbols is a first symbol among the one group of symbols.

Optionally, the specific symbol is the symbol position of the first column of DMRS.

Optionally, for the slot-based scheduling mode, the first column of DMRS is located at the 3rd or 4th symbol of the slot, and for the non-slot-based scheduling mode, the first column of DMRS is located at the first symbol of the data channel, that is, the first symbol among the one group of symbols.

Optionally, sending the DCI to the terminal device through the first DCI format among the multiple DCI formats includes: sending the DCI to the terminal device on a first resource through the first DCI format.

When the first DCI format is the first type of DCI format, the first resource is a resource in unit of slot.

When the first DCI format is the second type of DCI format, the first resource is a resource in unit of symbol.

Optionally, the terminal device may determine the DCI format according to the granularity of the first resource. For example, if the granularity of the first resource is a slot, the DCI format is the first type of DCI format. If the granularity of the first resource is a symbol, the DCI format is the second type of DCI format.

Optionally, the first resource is a control resource set or a search space for transmitting a physical downlink control channel.

Therefore, in a wireless communication method of an implementation of the present application, a network device indicates a time domain resource in unit of slot through a first type of DCI format and indicates a time domain resource in unit of symbol through a second type of DCI format. Thereby, the network device may implicitly indicate a resource scheduling mode through a downlink control information format, so that the control signaling overhead caused by the indication of control signaling is avoided, and the operation complexity and energy consumption of the terminal device are reduced.

Further, the network device indicates the presence of at least one reference signal located at a specific symbol of a slot through a first type of DCI format and indicates the presence of at least one reference signal located at a specific symbol of one group of symbols through a second type of DCI format. Thereby, the network device may implicitly indicate a reference signal transmission mode through a downlink control information format, so that the control signaling overhead caused by the indication of control signaling is avoided, and the operation complexity and energy consumption of the terminal device are reduced.

FIG. 3 is a schematic flowchart of a wireless communication method 300 according to an implementation of the present application. As shown in FIG. 3, the method 300 may be performed by a terminal device, which may be the terminal device as shown in FIG. 1, and a network device in the method 300 may be the network device as shown in FIG. 1. The method 300 includes the following contents.

In act 310, a terminal device receives downlink control information (DCI) from a network device.

In act 320, the terminal device determines a DCI format of the DCI.

Optionally, the DCI format of the DCI is the first type of DCI format or the second type of DCI format.

Optionally, the first type of DCI format corresponds to a first resource scheduling mode, the second type of DCI format corresponds to a second resource scheduling mode, the first resource scheduling mode indicates a time domain resource in unit of slot, and the second resource scheduling mode indicates a time domain resource in unit of symbol.

In act 330, the terminal device determines a resource scheduling mode of a data channel corresponding to the DCI according to the DCI format of the DCI.

Optionally, the method 300 further includes: determining, by the terminal device, a reference signal mode of the data channel according to the DCI format of the DCI, wherein the first type of DCI format corresponds to a first reference signal mode, the second type of DCI format corresponds to a second reference signal mode, there is at least one reference signal located at a specific symbol of a slot in the first reference signal mode, there is at least one reference signal located at a specific symbol among one group of symbols in the second reference signal mode, and the one group of symbols are symbols used for transmitting the data channel and a reference signal of the data channel; and determining, by the terminal device, a reference signal position of the data channel according to a reference signal mode of the data channel.

Optionally, the specific symbol of the slot is a third time domain symbol or a fourth time domain symbol of the slot.

Optionally, the specific symbol among the one group of symbols is a first symbol among the one group of symbols.

Optionally, the reference signal is a demodulation reference signal (DMRS).

Optionally, receiving the DCI from the network device includes: receiving the DCI from the network device on a first resource, wherein when the first resource is a resource in unit of slot, the DCI format is the first type of DCI format, and when the first resource is a resource in unit of symbol, the DCI format is the second type of DCI format; determining the DCI format of the DCI includes: determining, by the terminal device, the DCI format of the DCI according to the first resource.

Optionally, the first resource is a control resource set (CORESET) or a search space (Search Space) for transmitting a physical downlink control channel.

Figure 4:
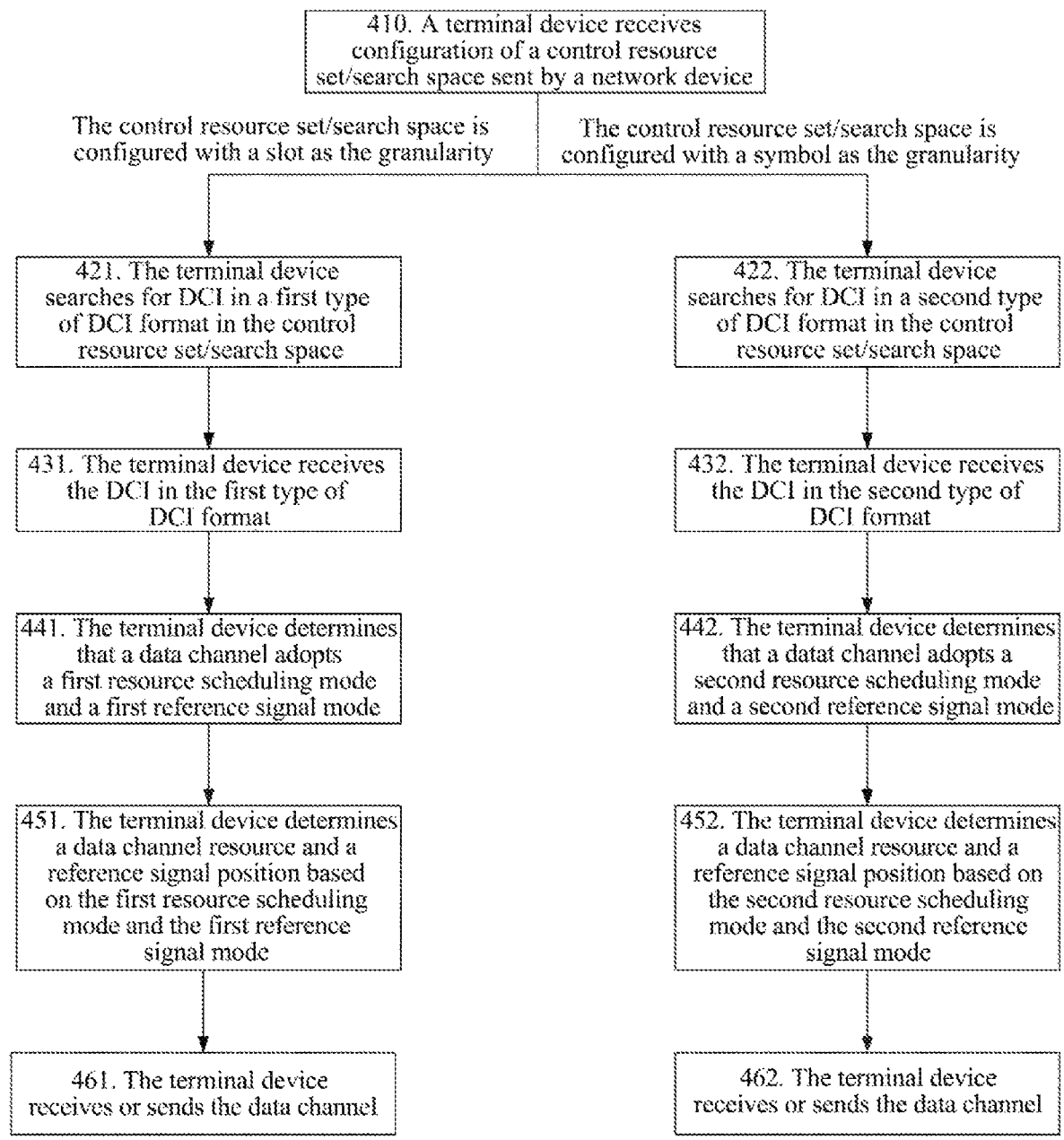
FIG. 4 is a schematic diagram of a transmission data channel according to an implementation of the present application.

Optionally, as shown in FIG. 4, as an implementation, a terminal device may determine a searched DCI format according to a cycle of the first resource (control resource set or search space), and determine a data channel scheduling mode and DMRS symbol position according to the DCI format.

Specifically, FIG. 4 shows following acts.

In act 410, a terminal device receives configuration of a control resource set/search space sent by a network device.

Optionally, the configuration of the control resource set/search space may be configured with a slot as the granularity, or configured with a symbol as the granularity.

In act 421, if the control resource set/search space is configured with a slot as the granularity, the terminal device searches for DCI in a first type of DCI format in the control resource set/search space.

In act 431, the terminal device receives the DCI in the first type of DCI format.

In act 441, the terminal device determines that a data channel adopts a first resource scheduling mode and a first reference signal mode.

In act 451, the terminal device determines a data channel resource and a reference signal position based on the first resource scheduling mode and the first reference signal mode.

In act 461, the terminal device receives or sends the data channel.

In act 422, if the control resource set/search space is configured with a symbol as the granularity, the terminal device searches for DCI in a second type of DCI format in the control resource set/search space.

In act 432, the terminal device receives the DCI in the second type of DCI format.

In act 442, the terminal device determines that a data channel adopts a second resource scheduling mode and a second reference signal mode.

In act 452, the terminal device determines a data channel resource and a reference signal position based on the second resource scheduling mode and the second reference signal mode.

In act 462, the terminal device receives or sends the data channel.

Figure 5:
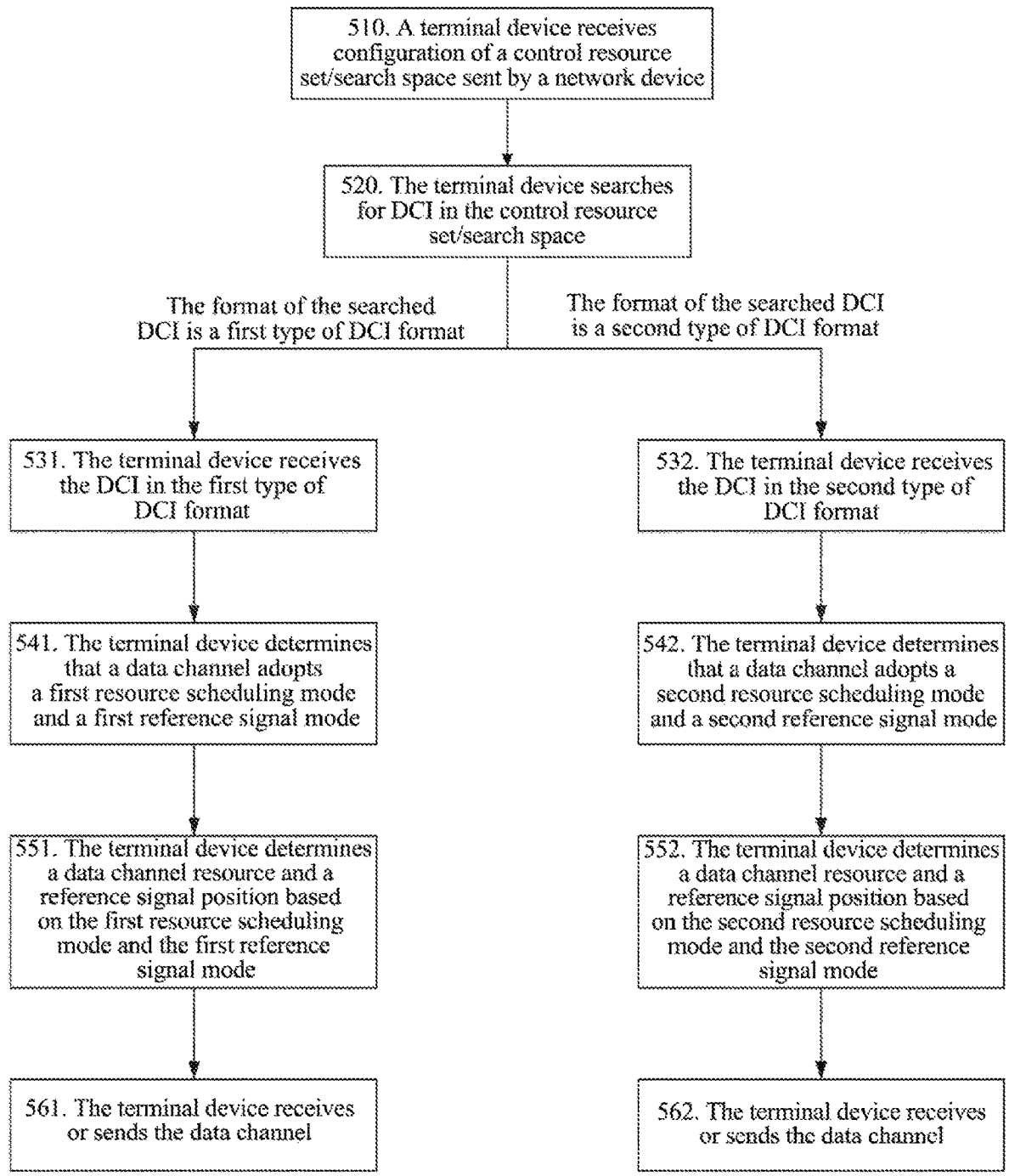
FIG. 5 is a schematic diagram of another transmission data channel according to an implementation of the present application.

Optionally, as shown in FIG. 5, as an implementation, a terminal device may determine a data channel scheduling mode and DMRS symbol position according to a DCI format.

Specifically, FIG. 5 shows following acts.

In act 510, a terminal device receives configuration of a control resource set/search space sent by a network device.

In act 520, the terminal device searches for DCI in the control resource set/search space.

In act 531, if the format of the searched DCI is a first type of DCI format, the terminal device receives the DCI in the first type of DCI format.

In act 541, the terminal device determines that a data channel adopts a first resource scheduling mode and a first reference signal mode.

In act 551, the terminal device determines a data channel resource and a reference signal position based on the first resource scheduling mode and the first reference signal mode.

In act 561, the terminal device receives or sends the data channel.

In act 532, if the format of the searched DCI is a second type of DCI format, the terminal device receives the DCI in the second type of DCI format.

In act 542, the terminal device determines that a data channel adopts a second resource scheduling mode and a second reference signal mode.

In act 552, the terminal device determines a data channel resource and a reference signal position based on the second resource scheduling mode and the second reference signal mode.

In act 562, the terminal device receives or sends the data channel.

It should be understood that the acts in the wireless communication method 300 may refer to the description of corresponding acts in the wireless communication method 200, and will not be repeated here for the sake of brevity.

Therefore, in a wireless communication method of an implementation of the present application, a network device indicates a time domain resource in unit of slot through a first type of DCI format and indicates a time domain resource in unit of symbol through a second type of DCI format. Thereby, the network device may implicitly indicate a resource scheduling mode through a downlink control information format, so that the control signaling overhead caused by the indication of control signaling is avoided, and the operation complexity and energy consumption of the terminal device are reduced.

Further, the network device indicates the presence of at least one reference signal located at a specific symbol of a slot through a first type of DCI format and indicates the presence of at least one reference signal located at a specific symbol of one group of symbols through a second type of DCI format. Thereby, the network device may implicitly indicate a reference signal transmission mode through a downlink control information format, so that the control signaling overhead caused by the indication of control signaling is avoided, and the operation complexity and energy consumption of the terminal device are reduced.

Further, the terminal device may determine the DCI format corresponding to the DCI through the granularity of the first resource on the time domain, and further determine the resource scheduling mode and/or the reference signal transmission mode according to the type of the DCI format.

Figure 6:
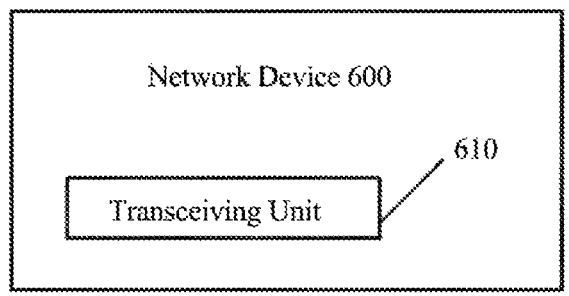
FIG. 6 is a schematic block diagram of a network device according to an implementation of the present application.

FIG. 6 is a schematic block diagram of a network device 600 according to an implementation of the present application. As shown in FIG. 6, the network device 600 includes a transceiving unit 610.

The transceiving unit 610 is used for sending DCI to a terminal device through a first DCI format among multiple DCI formats.

The multiple DCI formats include a first type of DCI format and a second type of DCI format, the first type of DCI format corresponds to a first resource scheduling mode, the second type of DCI format corresponds to a second resource scheduling mode, the first resource scheduling mode indicates a time domain resource in unit of slot, the second resource scheduling mode indicates a time domain resource in unit of symbol, and the first DCI format is the first type of DCI format or the second type of DCI format.

The transceiving unit 610 is further used for transmitting a data channel through a resource scheduling mode corresponding to the first DCI format.

Optionally, the transceiving unit 610 is further used for transmitting a reference signal of the data channel through a reference signal mode corresponding to the first DCI format.

The first type of DCI format corresponds to a first reference signal mode, the second type of DCI format corresponds to a second reference signal mode, there is at least one reference signal located at a specific symbol of a slot in the first reference signal mode, there is at least one reference signal located at a specific symbol among one group of symbols in the second reference signal mode, and the one group of symbols are symbols used for transmitting the data channel and a reference signal of the data channel.

Optionally, the specific symbol of the slot is a third time domain symbol or a fourth time domain symbol of the slot.

Optionally, the specific symbol among the one group of symbols is a first symbol among the one group of symbols.

Optionally, the reference signal is a demodulation reference signal (DMRS).

Optionally, the transceiving unit 610 is specifically used for sending the DCI to the terminal device on a first resource through the first DCI format.

When the first DCI format is the first type of DCI format, the first resource is a resource in unit of slot.

When the first DCI format is the second type of DCI format, the first resource is a resource in unit of symbol.

Optionally, the first resource is a control resource set or a search space for transmitting a physical downlink control channel.

It should be understood that the network device 600 according to the implementation of the present application may correspond to the network device in the method implementations of the present application, and the above and other operations and/or functions of various units in the network device 600 are respectively for realizing the corresponding processes of the network device in the method 200 shown in FIG. 2, and will not be repeated here for the sake of brevity.

Figure 7:
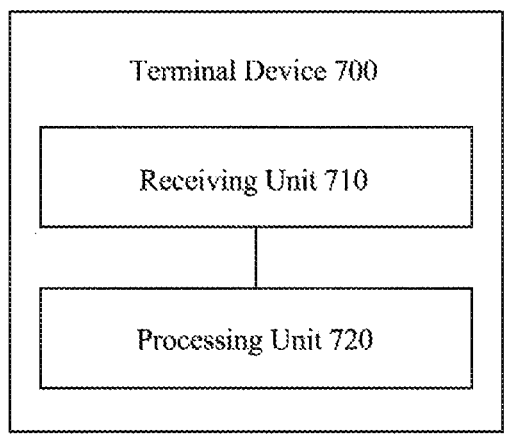
FIG. 7 is a schematic block diagram of a terminal device according to an implementation of the present application.

FIG. 7 is a schematic block diagram of a terminal device 700 according to an implementation of the present application. As shown in FIG. 7, the terminal device 700 includes a receiving unit 710 and a processing unit 720.

The receiving unit 710 is used for receiving downlink control information (DCI) from a network device.

The processing unit 720 is used for determining a DCI format of the DCI.

The DCI format of the DCI is a first type of DCI format or a second type of DCI format, the first type of DCI format corresponds to a first resource scheduling mode, the second type of DCI format corresponds to a second resource scheduling mode, the first resource scheduling mode indicates a time domain resource in unit of slot, and the second resource scheduling mode indicates a time domain resource in unit of symbol.

The processing unit 720 is further used for determining a resource scheduling mode of a data channel corresponding to the DCI according to the DCI format of the DCI.

Optionally, the processing unit 720 is further used for determining a reference signal mode of the data channel according to the DCI format of the DCI.

The first type of DCI format corresponds to a first reference signal mode, the second type of DCI format corresponds to a second reference signal mode, there is at least one reference signal located at a specific symbol of a slot in the first reference signal mode, there is at least one reference signal located at a specific symbol among one group of symbols in the second reference signal mode, and the one group of symbols are symbols used for transmitting the data channel and a reference signal of the data channel.

The processing unit 720 is further used for determining a reference signal position of the data channel according to a reference signal mode of the data channel.

Optionally, the specific symbol of the slot is a third time domain symbol or a fourth time domain symbol of the slot.

Optionally, the specific symbol among the one group of symbols is a first symbol among the one group of symbols.

Optionally, the reference signal is a demodulation reference signal (DMRS).

Optionally, the receiving unit 710 is further used for receiving the DCI from the network device on a first resource. If the first resource is a resource in unit of slot, the DCI format is the first type of DCI format, and if the first resource is a resource in unit of symbol, the DCI format is the second type of DCI format.

The processing unit 720 is further used for determining the DCI format of the DCI according to the first resource.

Optionally, the first resource is a control resource set or a search space for transmitting a physical downlink control channel.

It should be understood that the terminal device 700 according to the implementation of the present application may correspond to the terminal device in the method implementation of the present application, and the above and other operations and/or functions of various units in the terminal device 700 are respectively for realizing the corresponding processes of the terminal device in the method 300 shown in FIG. 3, and will not be repeated here for brevity.

Figure 8:
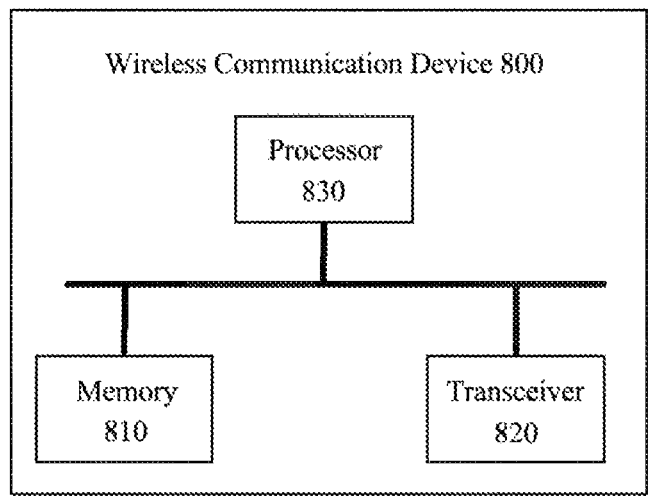
FIG. 8 shows a schematic block diagram of a device for wireless communication provided by an implementation of the present application.

FIG. 8 shows a schematic block diagram of a device 800 for wireless communication provided by an implementation of the present application. The device 800 includes: a memory 810 used for storing a program including codes, a transceiver 820 used for communicating with other devices, and a processor 830 used for executing program codes in the memory 810.

Optionally, when the codes are executed, the processor 830 may implement various operations performed by the network device in the method 200 in FIG. 2, which will not be repeated here for brevity. In this case, the device 800 may be an access network device or a core network device. The transceiver 820 is used for performing specific transmitting and receiving of signals under the driving of the processor 830.

Optionally, when the codes are executed, the processor 830 may implement various operations performed by the terminal device in the method 300 in FIG. 3, which will not be repeated here for brevity. In this case, the device 800 may be a terminal device, such as a cell phone.

It should be understood that in the implementation of the present application, the processor 830 may be a Central Processing Unit (CPU), or the processor 830 may be another general purpose processor, a digital signal processor (DSP), an application specific integrated circuit (ASIC), a field programmable gate array (FPGA) or another programmable logic device, a discrete gate or transistor logic device, a discrete hardware component, or the like. The general purpose processor may be a microprocessor or the processor may be any conventional processor or the like.

The memory 810 may include a read only memory and a random access memory, and provide instructions and data to the processor 830. A portion of memory 810 may include non-transitory random access memory. For example, the memory 810 may also store type information of a device.

The transceiver 820 may be used for implementing signal transmission and reception functions, such as frequency modulation and demodulation functions, or up-conversion and down-conversion functions.

In the implementation process, at least one act of the method may be completed by an integrated logic circuit of hardware in the processor 830, or the integrated logic circuit may complete the at least one act under the driving of instructions in a form of software. Therefore, the wireless communication device 800 may be a chip or chip set. The acts of the method disclosed in connection with the implementation of the present application may be directly embodied to be completed by an execution of a hardware processor or by an execution of a combination of hardware and software modules in a processor. The software modules may be located in a storage medium commonly used in the art, such as a random access memory, a flash memory, a read-only memory, a programmable read-only memory or an electrically erasable programmable memory, or a register. The storage medium is located in the memory, and the processor 830 reads the information in the memory and accomplishes the acts of the method with its hardware. In order to avoid repetition, it will not be described in detail here.

Figure 9:
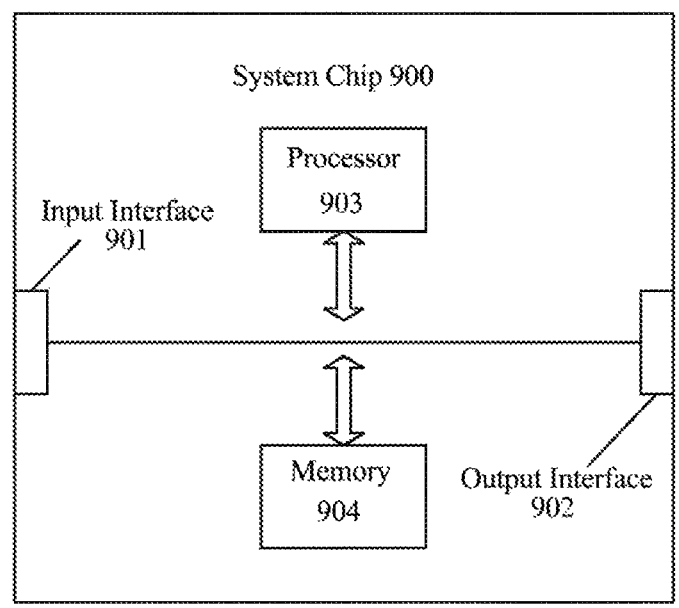
FIG. 9 is a schematic structural diagram of a system chip according to an implementation of the present application.

FIG. 9 is a schematic block diagram of a system chip 900 according to an implementation of the present application. The system chip 900 of FIG. 9 includes an input interface 901, an output interface 902, a processor 903 and a memory 904, which may be connected through internal communication connection lines. The processor 903 is used for executing codes in the memory 904.

Optionally, when the codes are executed, the processor 903 implements the method executed by the network device in the method implementation. For sake of conciseness, the specific description will not be repeated here.

Optionally, when the codes are executed, the processor 903 implements the method executed by the terminal device in the method implementation. For sake of conciseness, the specific description will not be repeated here.

Those of ordinary skill in the art will recognize that the example units and algorithm acts described in connection with the implementations disclosed herein may be implemented in electronic hardware, or a combination of computer software and electronic hardware. Whether these functions are implemented in hardware or software depends on a specific application and design constraint of the technical solution. Skilled in the art may use different methods to realize the described functions for each particular application, but such realization should not be considered to be beyond the scope of the present application.

Those skilled in the art may clearly understand that for convenience and conciseness of description, the specific working process of the system, apparatus and unit described above may refer to the corresponding process in the aforementioned implementations of methods, and details are not described herein again.

In several implementations provided by the present application, it should be understood that the disclosed system, apparatus and method may be implemented in other ways. For example, the apparatus implementation described above is only illustrative, for example, the division of the unit is only a logical function division, and there may be other ways of division in actual implementation, for example, multiple units or components may be combined or integrated into another system, or some features may be ignored or not executed. On the other hand, the mutual coupling or direct coupling or communication connection shown or discussed may be indirect coupling or communication connection through some interfaces, apparatuses or units, and may be in electrical, mechanical or other forms.

The units described as separated components may or may not be physically separated, and the component shown as a unit may or may not be a physical unit, i.e., it may be located in one place or may be allocated over multiple network units. Some or all of the units may be selected according to practical needs to achieve a purpose of the solution of the implementations.

In addition, various functional units in various implementations of the present application may be integrated in one processing unit, or various units may be physically present separately, or two or more units may be integrated in one unit.

The functions may be stored in a computer readable storage medium if implemented in a form of software functional units and sold or used as a separate product. Based on this understanding, the technical solution of the present application, in essence, or the part contributing to the existing art, or the part of the technical solution, may be embodied in the form of a software product stored in a storage medium, including several instructions for causing a computer device (which may be a personal computer, a server, or a network device, etc.) to perform all or part of the acts of the methods described in various implementations of the present application. The aforementioned storage medium includes various media capable of storing program codes, such as a U disk, a mobile hard disk, a read-only memory (ROM), a random access memory (RAM), a magnetic disk, or an optical disk.

The foregoing are merely example implementations of the present application, but the protection scope of the present application is not limited thereto. Any person skilled in the art may easily conceive variations or substitutions within the technical scope disclosed by the present application, which should be included within the protection scope of the present application. Therefore, the protection scope of the present application should be subject to the protection scope of the claims.

What is claimed is:

1. A method for wireless communication, comprising:
receiving downlink control information (DCI) from a network device;
determining a DCI format of the DCI, wherein the DCI format of the DCI is a first type of DCI format or a second type of DCI format, the first type of DCI format corresponds to a first resource scheduling mode, the second type of DCI format corresponds to a second resource scheduling mode, the first resource scheduling mode indicates a time domain resource in unit of slot, and the second resource scheduling mode indicates a time domain resource in unit of symbol;
determining a resource scheduling mode of a data channel corresponding to the DCI according to the DCI format of the DCI;
determining a reference signal mode of the data channel according to the DCI format of the DCI, wherein the first type of DCI format corresponds to a first reference signal mode, the second type of DCI format corresponds to a second reference signal mode, there is at least one reference signal located at a specific symbol of a slot in the first reference signal mode, there is at least one reference signal located at a specific symbol among one group of symbols in the second reference signal mode, and the one group of symbols are symbols used for transmitting the data channel and a reference signal of the data channel; and
determining a reference signal position of the data channel according to the reference signal mode of the data channel.

2. The method according to claim 1, wherein the specific symbol of the slot is a third time domain symbol or a fourth time domain symbol of the slot.

3. The method according to claim 1, wherein the specific symbol among the one group of symbols is a first symbol among the one group of symbols.

4. The method according to claim 1, wherein the reference signal is a demodulation reference signal (DMRS).

5. The method according to claim 1, wherein receiving the DCI from the network device comprises:
   receiving the DCI from the network device on a first resource, wherein when the first resource is a resource in unit of slot, the DCI format is the first type of DCI format, and when the first resource is a resource in unit of symbol, the DCI format is the second type of DCI format; and
   determining the DCI format of the DCI comprises:
   determining the DCI format of the DCI according to the first resource.

6. The method according to claim 5, wherein the first resource is a control resource set or a search space for transmitting a physical downlink control channel.

7. A network device, comprising:
   a transceiver, used for sending downlink control information (DCI) to a terminal device through a first DCI format among multiple DCI formats, wherein
   the multiple DCI formats comprise a first type of DCI format and a second type of DCI format, the first type of DCI format corresponds to a first resource scheduling mode, the second type of DCI format corresponds to a second resource scheduling mode, the first resource scheduling mode indicates a time domain resource in unit of slot, the second resource scheduling mode indicates a time domain resource in unit of symbol, and the first DCI format is the first type of DCI format or the second type of DCI format;
   the transceiver is further used for transmitting a data channel through a resource scheduling mode corresponding to the first DCI format;
   the transceiver is further used for transmitting a reference signal of the data channel through a reference signal mode corresponding to the first DCI format; and
   the first type of DCI format corresponds to a first reference signal mode, the second type of DCI format corresponds to a second reference signal mode, there is at least one reference signal located at a specific symbol of a slot in the first reference signal mode, there is at least one reference signal located at a specific symbol among one group of symbols in the second reference signal mode, and the one group of symbols are symbols used for transmitting the data channel and the reference signal of the data channel.

8. The network device according to claim 7, wherein the specific symbol of the slot is a third time domain symbol or a fourth time domain symbol of the slot.

9. The network device according to claim 7, wherein the specific symbol among the one group of symbols is a first symbol among the one group of symbols;
   or
   wherein the reference signal is a demodulation reference signal (DMRS).

10. The network device according to claim 7, wherein the transceiver is specifically used for sending the DCI to the terminal device on a first resource through the first DCI format; wherein:
   when the first DCI format is the first type of DCI format, the first resource is a resource in unit of slot; and
   when the first DCI format is the second type of DCI format, the first resource is a resource in unit of symbol.

11. The network device according to claim 10, wherein the first resource is a control resource set or a search space for transmitting a physical downlink control channel.

12. A terminal device, comprising:
   a transceiver used for receiving downlink control information (DCI) from a network device; and
   a processor used for determining a DCI format of the DCI; wherein
   the DCI format of the DCI is a first type of DCI format or a second type of DCI format, the first type of DCI format corresponds to a first resource scheduling mode, the second type of DCI format corresponds to a second resource scheduling mode, the first resource scheduling mode indicates a time domain resource in unit of slot, and the second resource scheduling mode indicates a time domain resource in unit of symbol;
   the processor is further used for determining a resource scheduling mode of a data channel corresponding to the DCI according to the DCI format of the DCI;
   the processor is further used for determining a reference signal mode of the data channel according to the DCI format of the DCI;
   the first type of DCI format corresponds to a first reference signal mode, the second type of DCI format corresponds to a second reference signal mode, there is at least one reference signal located at a specific symbol of a slot in the first reference signal mode, there is at least one reference signal located at a specific symbol among one group of symbols in the second reference signal mode, and the group of symbols are symbols used for transmitting the data channel and a reference signal of the data channel; and
   the processor is further used for determining a reference signal position of the data channel according to the reference signal mode of the data channel.

13. The terminal device according to claim 12, wherein the specific symbol of the slot is a third time domain symbol or a fourth time domain symbol of the slot.

14. The terminal device according to claim 12, wherein the specific symbol among the one group of symbols is a first symbol among the one group of symbols.

15. The terminal device according to claim 12, wherein the reference signal is a demodulation reference signal (DMRS).

16. The terminal device according to claim 12, wherein the transceiver is further used for receiving the DCI from the network device on a first resource, wherein when the first resource is a resource in unit of slot, the DCI format is the first type of DCI format, and when the first resource is a resource in unit of symbol, the DCI format is the second type of DCI format; and
   the processor is further used for determining the DCI format of the DCI according to the first resource.

17. The terminal device according to claim 16, wherein the first resource is a control resource set or a search space for transmitting a physical downlink control channel.

* * * * *